Oct. 10, 1961    J. H. FERGUSON, JR., ET AL    3,003,745
TURBINE WHEEL CONTAINMENT
Filed Oct. 31, 1957

INVENTORS.
JOHN H. FERGUSON JR.
DENNEN J. BUNGER
BY
Robert W. Ely
ATTORNEY

United States Patent Office 3,003,745
Patented Oct. 10, 1961

3,003,745
TURBINE WHEEL CONTAINMENT
John H. Ferguson, Jr., Sauquoit, and Dennen J. Bunger, Whitesboro, N.Y., assignors to The Bendix Corporation, a corporation of Delaware
Filed Oct. 31, 1957, Ser. No. 693,728
1 Claim. (Cl. 253—77)

The present invention relates to aircraft starters having high speed turbine wheels and more particularly concerns the turbine housing and the construction between turbine buckets and the outer edge of the turbine wheel which is incorporated in an aircraft combustion starter.

In some aircraft starter turbines, buckets are welded to the edge of a turbine disc or hub section. By choice of materials and fabrication, the weld section is the low strength section of a turbine disc having a uniform stress profile in cross section. Under certain conditions, such as high speed which can result when the speed safety control of the starter malfunctions, the turbine buckets separate at the weldment or stressed section from the turbine and pass at high speeds through the surrounding housing. Separation of one bucket results in an unbalancing which quickly causes other buckets to separate and fracture of the turbine shaft. The result is referred to as a "blow-up" of the turbine wheel. The bullet-like buckets have caused serious damage to aircraft engines and accessories and personnel. Fuel lines adjacent the aircraft starter are sometimes severed and fire results. The "blow-up" of turbines of a current combustion starter occurs at about 65–75,000 r.p.m. which is appreciably above the normal cut-off speed of about 44–49,000 r.p.m. which is sufficient for starting the engine. Separation of the buckets occurs after a hair-line crack develops and extends from the small radial separation between the buckets to the location of the weld. As long as this development is on a radial line, separation of the bucket usually does not occur. However, high speeds cause the crack to extend in a non-radial direction through the low strength section at the weldment and separation occurs. Bucket separation at low speeds (which are below the high speed at which the safety cut-off device shuts off the motive gas to the turbine) can also occur when the low strength weld section is faulty or weakened as can occur due to too frequent firings of the combustion starter with the resulting heat effects.

An object of the present invention is to provide an improved turbine assembly which reduces the hazards of turbine wheel "blow-up" by having bucket separation occur in a known pattern for containment of the turbine wheel.

A further object is to provide such an improved turbine assembly in which separation of one bucket will cause separation of adjacent buckets and then rubbing by buckets against a housing surface will occur whereby containment of the turbine wheel is possible by braking before complete separation of the turbine wheel.

In accordance with a preferred embodiment of the invention, the turbine buckets are welded to the hub section of the turbine wheel to give a low strength section and adjacent buckets are interlocked by a tongue and groove at the relatively low stressed section above the low strength weld section so that, when one bucket separates, it will be held by the interlock to adjacent buckets. Separation of adjacent buckets will then occur. A braking surface is provided for contact with the outer ends of the separated buckets so that rubbing will brake the turbine wheel before complete separation of the wheel occurs.

The accomplishment of above objects and the advantages and features of the present invention will further be apparent from the following description and the accompanying drawing in which.

Figure 1:
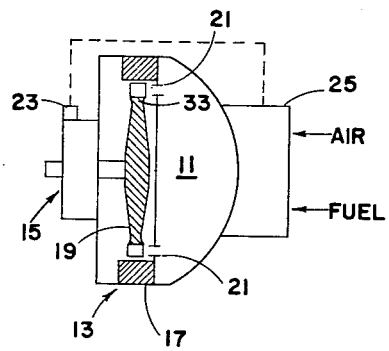
FIG. 1 is schematic showing of an aircraft combustion starter having a high speed turbine and a heavy housing adjacent the outer edges of the turbine buckets.

In the drawing, the gaps around the tongues or pins are enlarged in the interest of clarity.

In FIG. 1, the aircraft engine starter is diagrammatically shown and is comprised of a gas generator or combustion chamber 11, a turbine section 13 and reduction-gearing and engine-engaging section 15. It is to be noted that the exhaust shroud ring or housing 17 encasing the turbine 19 is indicated as of heavy cross-section and that the outer ends of the turbine buckets are closely spaced to the stainless steel housing. Gases are supplied to the turbine 19 through nozzles 21. Starter cut-off means 23 is responsive to the speed of the turbine and operates (as indicated by the dashed line) the valve control means 25 to interrupt the flow of fuel and air and hence the flow of combustion gases to the turbine 19 when starting speed is reached. This functioning normally prevents the starter turbine wheel from being rotated to "blow-up" speed by the gases. However, if the speed-responsive cut-off device 23 malfunctions, excessive speed would cause the turbine buckets to separate in random pattern, giving the aforenoted hazards, but for the safety provided by the present invention. The present invention combines a housing having a braking surface with a particularly-constructed turbine which will now be described in detail.

Figure 2:
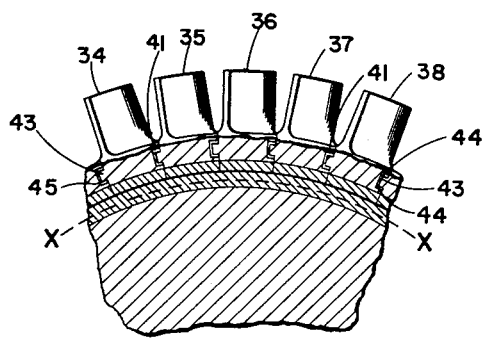
FIG. 2 is side view of part of a turbine wheel having buckets welded to the turbine wheel and having the bases of the buckets interlocked by tongue and groove constructions.
Figure 3:
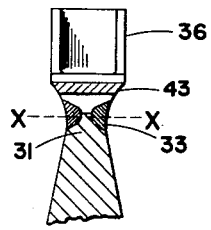
FIG. 3 is an axial cross-section of the bucket segment of the turbine wheel taken along a radial line of the front surface of the base of a bucket and shows the necked low strength section at the weld and the position of the tongue.

With reference to FIGS. 2 and 3, the construction of the turbine wheel will now be described. The turbine wheel 19 has a hub section 31 (the outer part of which is shown), a necked section 33 at the weld, and turbine buckets 34–38. The hub section is a hot-cold worked forging of stainless steel which contains nineteen percent chromium and nine percent nickel. The outer edge of the hub section 31 was beveled along the periphery to an inverted-V weld edge. Each of the buckets 34–39 is precision cast from a high temperature steel alloy (such as Stellite #21) and is comprised of a bucket section and a base section. The bucket section is a conventional V-type as seen from the top but can be of other well-known transverse cross-sections. The bucket base is originally box-like but is beveled at the bottom part to generally correspond to the beveled edge of the turbine wheel rim so that two circular weld grooves will exist when the buckets are positioned along the periphery or beveled edge of the hub section. The beveled edges are indicated by dashed lines in FIG. 3. When so positioned, the base sections of the buckets will be interlocked as will be described. After welding using Hastelloy W (a high nickel steel alloy) so that a weld bead is deposited in each groove, the turbine wheel is then machined so that a reduced or necked part 33 is formed at the weld juncture. The machining on both sides of the turbine is such as to produce a uniform-stress profile in cross section which has outwardly-tapered cross section. Since the welding anneals and weakens the outer edge part of the cold-worked turbine hub section and since the weld material has less strength than the hub or the bucket, the weld section is the low strength section. The weld material is such that it has appreciably less unit strength during operation than the forged material of the hub section. Thus, the weak necked portion 33 (adjacent the line X—X) is the separation or fracture location since it will be first affected by high stresses due to speed.

The lower part of the base section of each of the buckets has a rectangular groove or recess 41 in one face and a rectangular projection or tongue 43 from the opposite radial face. This wide lower part location is a relatively low stressed section. The tongue and groove extend axially the full length of buckets. It is to be noted that there are gaps 44 above and below tongues 43 and a gap 45 at the end of tongues 43. All gaps are enlarged in the drawing for clarity. This tongue and groove arrangement provide for each bucket to be interlocked into the next bucket so that, upon failure of a bucket (bucket 36, for example) at the stressed section X—X, this interlocking means will cause the weight from centrifugal force of this bucket 36 to be transferred to adjacent buckets 35, 37. See FIG. 4. This will occur because at the time of failure of bucket 36 across the stress section X—X the gaps 44 will close up and the bottom of the groove in bucket 36 will bear against the bottom of the tongue in bucket 37 and the top of the tongue in bucket 36 will bear against the top of the groove in bucket 35, etc. Buckets 35 and 37 will then partially fail, due to the centrifugal force from bucket 36. It is to be noted that the gaps are provided above and below each of the tongues and that the interlocking means are adjacent the upper edge of the weld. Slight radial pivoting of adjacent buckets is thus advantageously accommodated. The depth of the grooves is such that the metal cross-section from the bottom inner corner of the groove to the opposite side of the bucket has greater strength than the low strength cross-section X—X. It is to be appreciated that the gapped tongue-groove construction of one bucket does not, before separation, restrain adjacent buckets. Before failure, the buckets are held or attached solely by means of the weld and only upon failure at the low strength weld section does the tongue-groove construction become operative. In a typical embodiment, the top and bottom gaps 44 are each .005" and the end gap 45 is .004". The end gap 45 facilitates fabrication in that the radial faces of the buckets can be placed into abutment without interference from the tongues 43. The tongues 43 have a circumferential length of .048" or about one-ninth the circumferential length of the buckets. The ends of the buckets are spaced about .020" from the housing.

Figure 4:
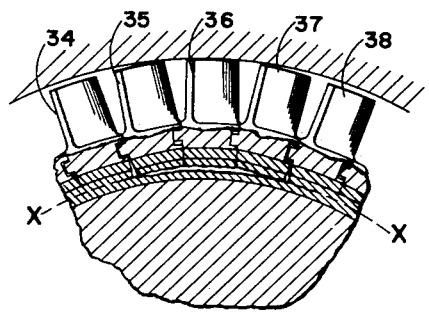
FIG. 4 is a side view of turbine wheel of FIG. 3 after one bucket is separated and partial separation of adjacent buckets occurs.

In operation, as seen by reference to FIGS. 2 and 4, the turbine, at either excessive speed or lower speeds with a fault at the low strength section, will develop a separation failure at the stress section X—X and bucket 36, for example, will move radially outward, closing the upper gaps 44 in adjacent buckets. The weight from the centrifugal force of bucket 36 will be transferred to buckets 35 and 37 by the tongue-groove interlock, as above described, causing them to fail at their low strength sections. Since buckets 35, 36, and 37 are restrained by the tongue and groove arrangements, the buckets 34 and 38 on the other side of 35 and 37 will fail next. At the time of complete failure of buckets 35–37, they will be held intact or interlocked and the outer edges of these buckets will contact the braking surface of the housing or shroud 17. This rubbing by a plurality of buckets 35–37 against the turbine housing will effect sufficient braking of the turbine 19 so that complete separation of the turbine wheel will be prevented and containment of the wheel will result.

Figure 5:
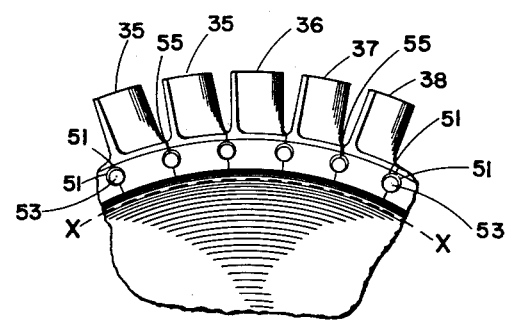
FIG. 5 is a side view of turbine wheel embodying a modified interlock which is comprised of two semi-circular grooves and a circular pin.

In FIG. 5, an alternate form of interlocking means is shown. The lower facing surfaces of the base parts of the buckets 34–38 have semi-circular grooves 51 and a circular pin 53 fits loosely in the bottom of the circular opening formed by the grooves. The pins 53 are attached by tack-brazing at the ends in order to prevent axial movement. This brazing has little strength and upon separation of a bucket will not interfere with the slight radial movement of the separated bucket. It is to be noted that in this embodiment crescent gaps 55 are provided since the circular opening formed by grooves 51 has a larger diameter than the diameter of the circular pin 53. Like the previously-described tongue and groove arrangement, this interlocking means extends axially through the buckets and is closely spaced to the circular top edge of the weld.

The operation in the FIG. 5 arrangement is similar to the FIG. 2–4 arrangement and need not be redescribed except to point out that top gaps between the circular hole formed by the grooves and the smaller-diameter pin will permit very limited pivoting of adjacent buckets and transfer of forces from the first-separated bucket to adjacent buckets as it moves radially outward. It is apparent that the bottom edges of the semi-circular grooves of the separated bucket will transmit force to the circular pin and hence to the top edges of the semi-circular grooves in adjacent buckets only after one bucket separates. As above described, subsequent separation of adjacent buckets will occur and the above-described braking and containment will result.

It is to be understood that persons skilled in the art can make changes in the disclosed embodiments of the invention without departing from the invention as set forth in the appended claim.

What is claimed is:

In a high-speed turbine, the safety improvement comprising a turbine housing having a heavy ring providing a braking surface, a turbine wheel having a hub section formed with an outer circular edge, buckets having base sections welded to said outer circular edge of said tub section, the outer ends of said buckets being adjacent said braking surface of said heavy ring of said housing, said bucket base sections having axially-extending radial faces, said radial faces being respectively in abutment with radial faces of adjacent bucket base sections, said turbine wheel being formed with a low strength, reduced cross section at the location where said buckets are welded to said hub section, each of said buckets having an integral tongue projecting from one of its axially-extending radial faces and having a groove formed in the other axially-extending radial face opposite said tongue, said tongues and grooves having a generally-square cross section and extending axially from one side to the other side of the respective bucket base sections, said tongues projecting respectively into the facing grooves, said tongues having a slightly smaller cross-section than said grooves and being arranged respectively so that said tongues are spaced a small distance from the sides of said grooves, the arrangement of said tongues in said grooves being such that when a bucket separates at said low strength section such bucket will move radially a limited distance to be restrained by adjacent buckets and to initiate separation of adjacent buckets, said heavy ring braking surface of said turbine housing being arranged and constructed such as to cause effective braking of said turbine wheel when one bucket separates and causes initial separation of buckets.

References Cited in the file of this patent

UNITED STATES PATENTS

| | | |
|---|---|---|
| 1,469,045 | MacMurchy | Sept. 25, 1923 |
| 1,600,346 | MacMurchy | Sept. 21, 1926 |
| 2,326,145 | Kroon | Aug. 10, 1943 |
| 2,380,276 | Warren | July 10, 1945 |
| 2,405,146 | Huber | Aug. 6, 1946 |
| 2,410,588 | Phelan et al. | Nov. 5, 1946 |
| 2,965,355 | Spaeth | Dec. 20, 1960 |

FOREIGN PATENTS

| | | |
|---|---|---|
| 646,491 | Great Britain | Nov. 22, 1950 |